US012637033B1

(12) United States Patent
Mishan

(10) Patent No.: US 12,637,033 B1
(45) Date of Patent: May 26, 2026

(54) PORTABLE TIRE INFLATOR WITH LIGHT FRAME AS VISUAL INDICATOR

(71) Applicant: E. MISHAN & SONS, INC., New York, NY (US)

(72) Inventor: Steven Mishan, New York, NY (US)

(73) Assignee: E. MISHAN & SONS, INC., New York, NY (US)

( * ) Notice: Subject to any disclaimer, the term of this patent is extended or adjusted under 35 U.S.C. 154(b) by 0 days.

(21) Appl. No.: 19/187,494

(22) Filed: Apr. 23, 2025

(51) Int. Cl.
*B60S 5/04* (2006.01)

(52) U.S. Cl.
CPC .................. *B60S 5/046* (2013.01); *B60S 5/04* (2013.01)

(58) Field of Classification Search
CPC ............. B60S 5/04; B60S 5/046; B60C 23/00
USPC ........................................................ 141/38
See application file for complete search history.

(56) References Cited

U.S. PATENT DOCUMENTS 8,925,594 B2 * 1/2015 Ohm ....................... F04B 35/04
141/94

FOREIGN PATENT DOCUMENTS

IT          202000011224 A1 * 11/2021 ............. G01L 17/00
* cited by examiner

*Primary Examiner* — Timothy L Maust
(74) *Attorney, Agent, or Firm* — Notaro, Michalos & Zaccaria P.C.

(57) ABSTRACT

A portable tire inflator has a front control panel surrounded by an opaque or clear bezel at a perimeter thereof. A pump motor is activated by a control button on the front control panel. A series of light sources are mounted in an internal space of the housing to form a same predetermined shape as the bezel. Light emitted by the light sources passes through the bezel. Each light source selectively emits a first color and a second color of light. A controller activates all of the light sources in the first color in a first mode and to sequentially activate certain of the light sources in the second color while maintaining others of the light sources in the first color in a second mode. The sequential activation of the light sources forms a predetermined pattern of light in the second color when viewed through the bezel.

13 Claims, 4 Drawing Sheets

PORTABLE TIRE INFLATOR WITH LIGHT FRAME AS VISUAL INDICATOR

FIELD

The present invention relates generally to portable tire inflators, and more particularly, to a portable tire inflator equipped with a light frame surrounding the front panel control buttons that serves as a visual indicator of the operational status of the pump.

BACKGROUND

Portable tire inflators are widely used to inflate vehicle tires and other inflatable objects. Typically, these devices are powered by an internal or external power source, such as a rechargeable battery or connection to a vehicle's power outlet. Most tire inflators are equipped with control buttons on a front panel to allow the user to start or stop the pump, adjust settings, and monitor the inflation process.

However, one of the challenges with existing portable inflators is the absence of a clear, immediate visual indication of the pump's operational status, especially when used in low-light conditions. Users often rely solely on sound or small display readouts to determine whether the pump is running or has finished inflating the tire. This can lead to confusion or improper usage, particularly when the unit is running quietly or when ambient noise interferes with auditory cues.

The inflator of the present disclosure addresses this issue by integrating a light frame around the front panel control buttons. This light frame acts as a dynamic visual indicator, displaying different light patterns to indicate the various states of operation (e.g., pump off, pump running, or motor actively inflating). This solution enhances the user experience by providing a clear and intuitive visual indicator of the inflator's status, which is particularly useful in dimly lit environments or during nighttime operation.

SUMMARY

The inflator of the present disclosure is directed to a portable tire inflator equipped with a light frame surrounding the control buttons on the front panel. This light frame is designed to function as a visual indicator that communicates the operational status of the inflator to the user through changes in light color and pattern. When the pump is turned on but not actively inflating, the light frame will illuminate in a solid blue color, indicating that the unit is powered on. When the pump motor is actively running (inflating the tire), the light frame will display an alternating white and blue light that walks in a clockwise direction, visually indicating active inflation. When the motor shuts off after inflation is complete, the light frame will return to a solid blue color, signaling that the pump is no longer running but still powered on. When the inflator unit is completely shut down, the light frame will turn off, indicating that the unit is no longer powered. This system provides users with an intuitive and easy-to-read visual cue that enhances the safety and usability of the tire inflator, particularly in low-light environments or situations where auditory cues may be insufficient.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure is directed to a portable tire inflator with a light frame that visually indicates the operating status of the inflator.

Figure 1:
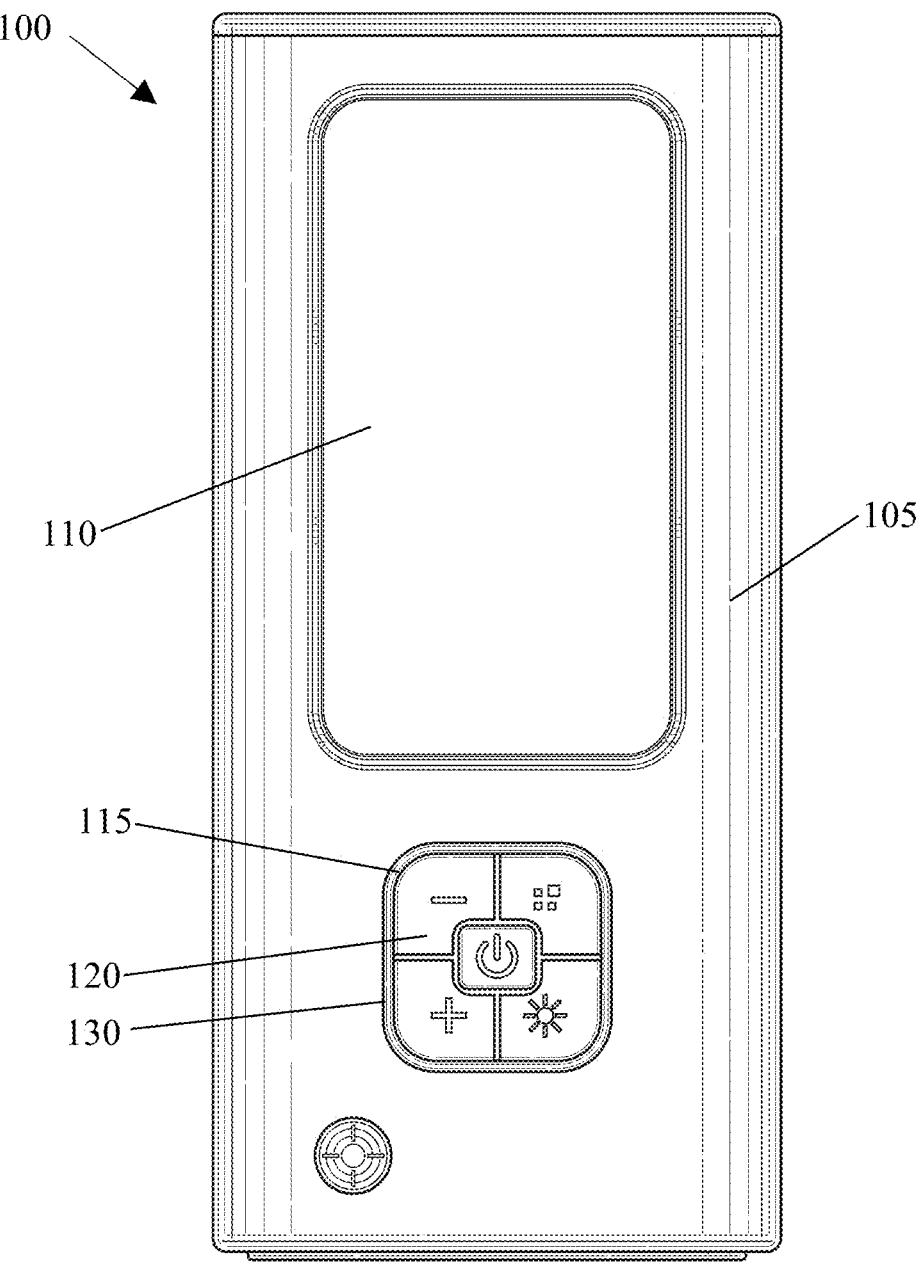
FIG. 1 is a front view of a portable tire inflator having a light frame surrounding the front panel control buttons in accordance with an aspect of the current disclosure.
Figure 2A:
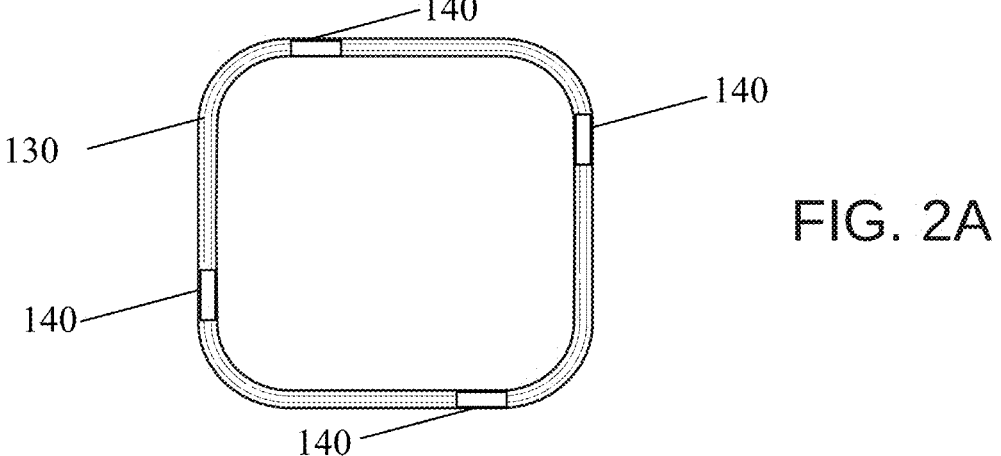
FIGS. 2A to 2D are block diagrams of the bezel that forms an outer portion of the light frame shown in FIG. 1 that show the walking pattern of light that moves around the bezel in an aspect of the present disclosure.
Figure 2B:
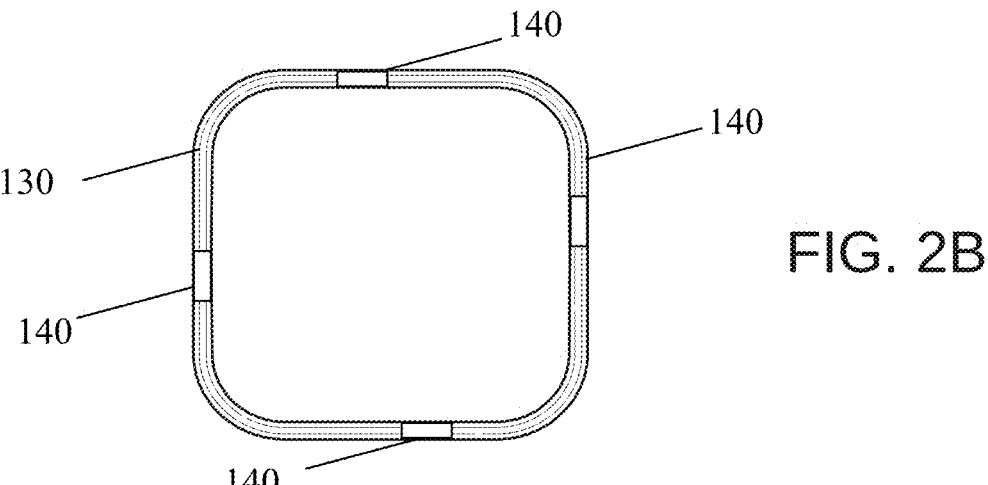
Figure 2C:
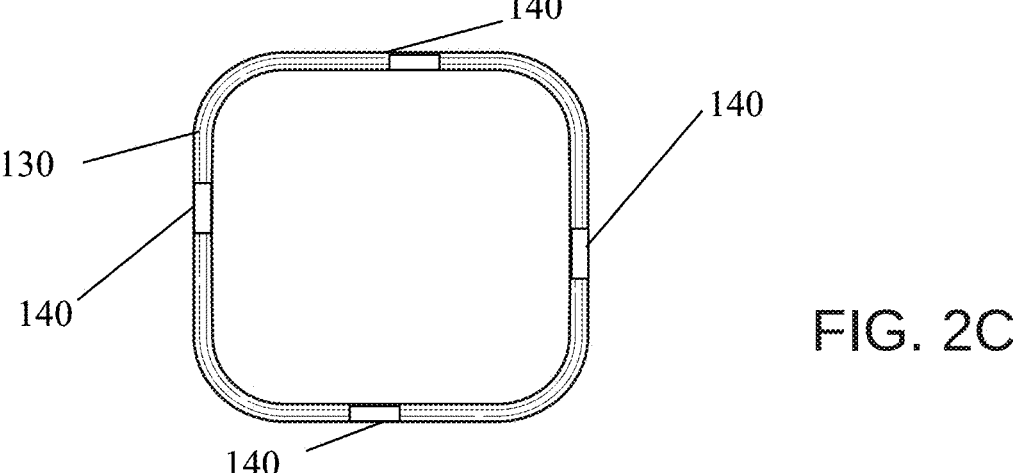
Figure 2D:
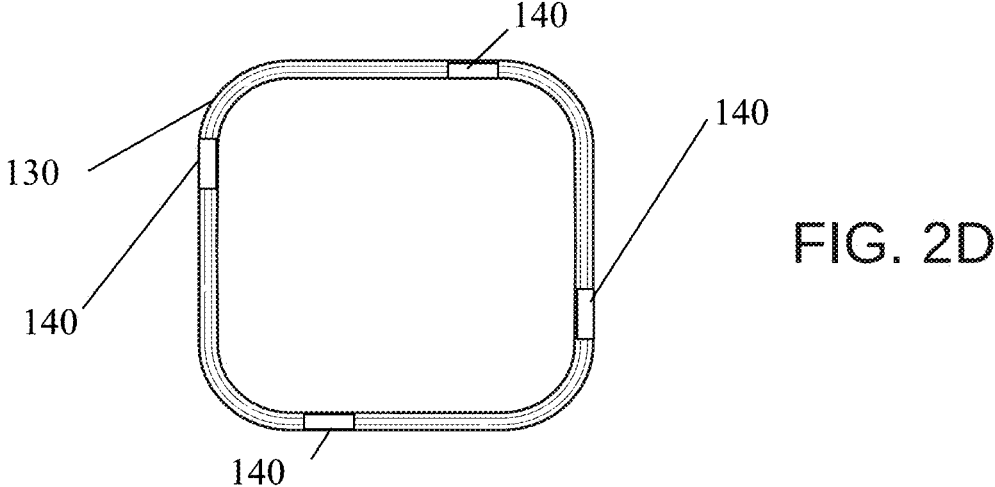

Referring now to FIG. 1, an inflator 100 is shown which has the following main components: a housing 105, a front display panel 110, a front control panel 115 having a number of main control buttons 120, and a bezel 130 that forms the outer portion of the light frame. The inflator 100 also includes a nozzle for connection to the tire, not shown. The inflator 100 is enclosed in a housing 105. The front display panel 110 provides status information, preferably including a current amount of battery charge and a desired inflation level for the tire. The front control panel 115 includes the main control buttons (such as power, pressure up, pressure down, pressure unit change, start inflation, etc.). The front control panel 115 is surrounded by bezel 130 that forms the outer portion of the light frame. The light frame provides a visual indicator of the unit's operational status.

The light frame includes the bezel 130 which is integrated into the housing 105 around the front control panel 115 and which may be clear or opaque. The walking pattern of light that moves around the bezel 130 is shown in FIGS. 2A to 2D. In these figures, the bezel 130 displays a first color of light (e.g., blue) in all parts except for the blocks labeled 140, which display a second color of light (e.g., white). As discussed herein, this walking pattern is provided continually when the pump is operating, providing a moving pattern of white light that moves clockwise around the bezel 130 due to the sequential activation of the light sources provided under the bezel 130.

Figure 3:
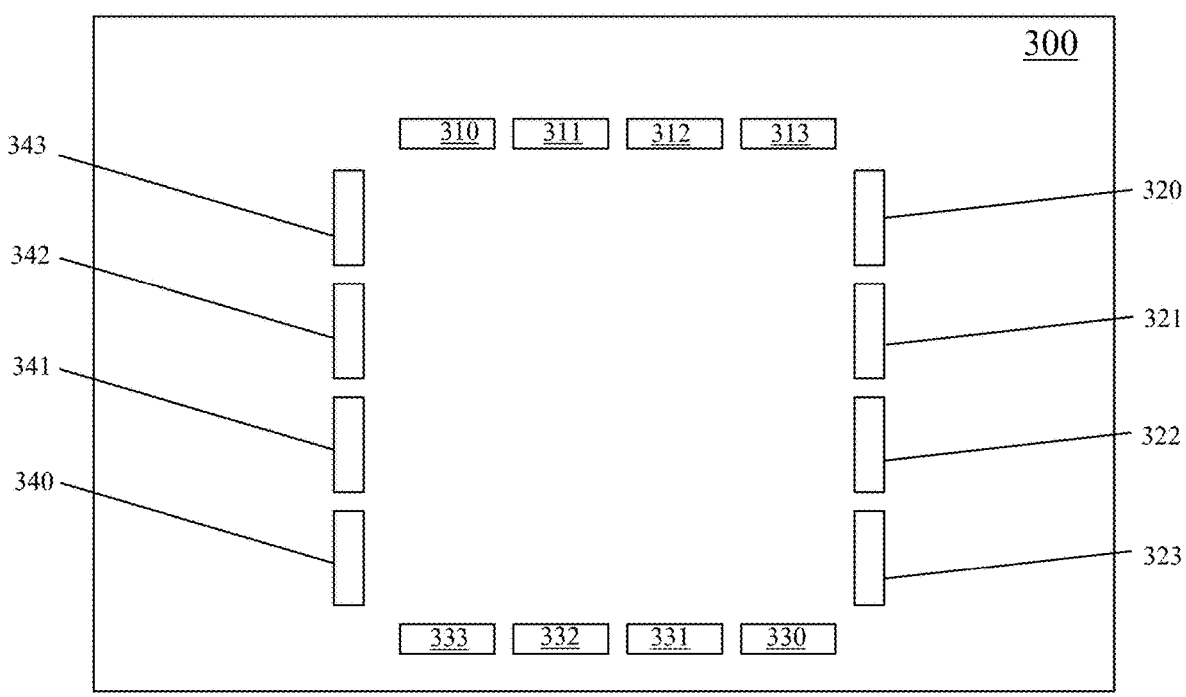
FIG. 3 is a diagram showing a partial view of an internal circuit board showing the layout of light emitting diode chips that form an inner portion of the light frame shown in FIG. 1.

The light frame also includes a series of light sources, light-emitting diodes (LEDs) or similar light sources, arranged on an internal circuit board 300 (FIG. 3) that is positioned directly under the bezel 130 in an internal space of housing 105. In one presently preferred embodiment shown in FIG. 3, four LED surface mount chips are mounted in a series underneath each side of the bezel 130. As shown in FIG. 3, the top side includes four LED surface mount chips 310 to 313, the right side includes four LED surface mount chips 320 to 323, the bottom side includes four LED surface mount chips 330 to 333, and the left side includes four LED surface mount chips 340 to 343. Each of these LED surface mount chips is capable of being driven in a first mode where a first color (e.g., blue) light is emitted and a second mode where a second color (e.g., white) light is emitted.

The light frame is configured to display different colors and lighting patterns, as described below, to indicate various operational states. First, when the inflator 100 is powered on but the pump motor is not running (e.g., standby mode), the light frame displays a solid color (e.g., blue). Next, when the pump motor is actively inflating a tire, the light frame displays an alternating light pattern of two different colors (e.g., blue and white), with the white light moving in a clockwise "walking" pattern around the perimeter of the control buttons. This motion pattern visually represents the active operation of the inflator 100. Once the pump motor shuts off after completing inflation, the light frame returns to the solid color, indicating that the unit is still on but not actively running. Finally, when the inflator 100 is completely shut down, the light frame turns off, signaling that the unit is no longer powered.

Figure 4:
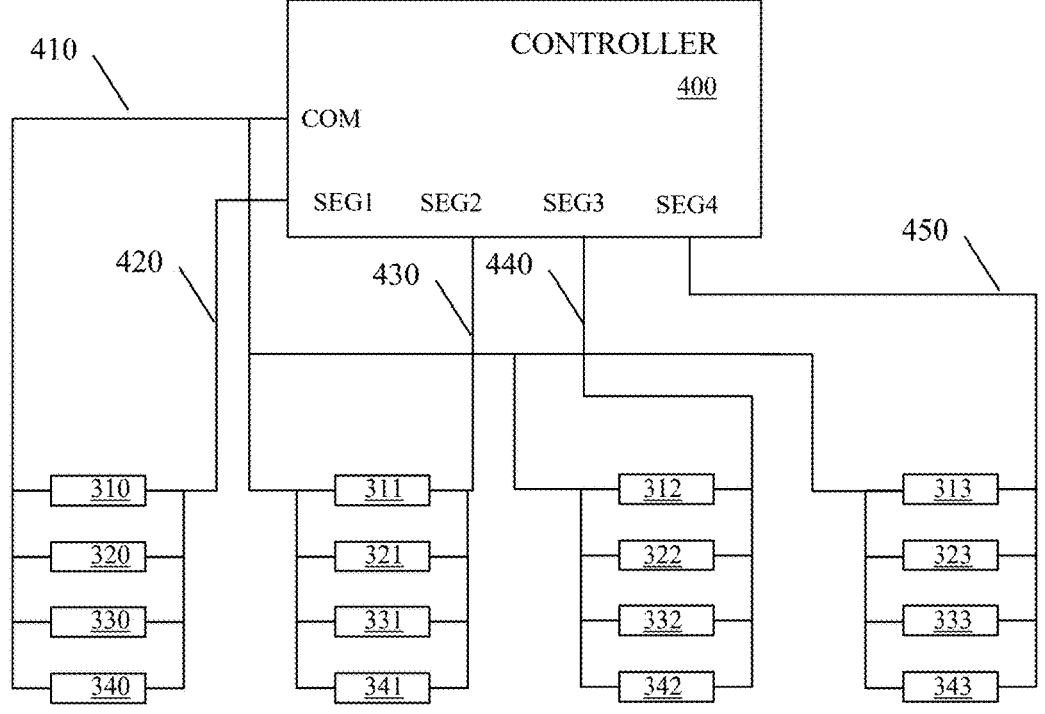
FIG. 4 is a schematic diagram of a control circuit for the light frame shown in FIG. 1.

Referring now to FIG. 4, the inflator 100 is equipped with circuitry that governs the operation of both the pump motor and the light frame. The control circuit preferably includes a controller 400 (a microprocessor or a similar type processing unit) that detects the operational status of the pump (e.g., powered on, motor activated and running, motor deactivated, complete shutdown) and controls the light frame accordingly. In a presently preferably embodiment, the controller 400 has a common line 410 coupled to one terminal of all of the LED chips 310 to 313, 320 to 232, 330 to 333 and 340 to 343 and four separate control lines, SEG1 420, SEG2 430, SEG3 440 and SEG4 450. The SEG1 420 control line is coupled to a second terminal of the first LED on each side, i.e., LEDs 310, 320, 330, 340. The SEG2 430 control line is coupled to a second terminal of the second LED on each side, i.e., LEDs 311, 321, 331, 341. The SEG3 440 control line is coupled to a second terminal of the third LED on each side, i.e., LEDs 312, 322, 332, 342. The SEG4 450 control line is coupled to a second terminal of the fourth LED on each side, i.e., LEDs 313, 323, 333, 343.

When the inflator 100 is turned on but the pump is not activated, all of the LEDs are in the same state, meaning control lines SEG1 420, SEG2 430, SEG3 440 and SEG4 450 are all in a state that causes the LEDs to have the same color, e.g., blue.

When the inflator 100 is turned on and the pump is activated, the controller 400 will continually change at least one of the four control lines to a state that causes the LEDs associated with that control line to have the second color, e.g., white. This is done at a speed that provides the desired clockwise walking light pattern in the bezel 130 as the LEDs change from blue to white and back.

Upon motor shutdown, the controller 400 sets all the control lines to the same state so that the light frame returns to a solid color, e.g., blue. When the inflator 100 is fully turned off, no signals exist and the light frame turns off.

This system of visual indicators provides an intuitive and highly visible way for users to monitor the status of the tire inflator, enhancing usability and safety, particularly in low-light environments or noisy surroundings.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A portable tire inflator, comprising:
a housing having a front control panel on an outer surface thereof, the front control panel including one or more control buttons;
a bezel surrounding the front control panel at a perimeter thereof, the bezel formed from a material that is opaque or clear and allows light to pass through, the bezel forming a predetermined shape;
a pump motor configured to inflate an inflatable object and which is activated by one of the one or more control buttons;
a circuit board mounted in an internal space of the housing, a series of light sources mounted on the circuit board to form the same predetermined shape of the bezel, the circuit board mounted directly under the bezel so that light emitted by the series of light sources passes through the bezel, the light sources are configured to emit a first color and a second color; and
a controller coupled to the series of light sources, the controller configured to activate all of the series of light sources in the first color when the pump motor is not activated and to sequentially activate certain of the series of light sources in the second color while maintaining others of the series of light sources in the first color when the pump motor is activated, the sequential activation of the light sources forming predetermined patterns of light in the second color when viewed through the bezel.

2. The portable tire inflator of claim 1, wherein each of the light sources in the series of light sources is a light emitting diode (LED).

3. The portable tire inflator of claim 2, wherein the first color emitted by each of the LEDs is blue.

4. The portable tire inflator of claim 2, wherein the second color emitted by each of the LEDs is white.

5. The portable tire inflator of claim 1, wherein the predetermined pattern is a walking pattern.

6. The portable tire inflator of claim 1, wherein the predetermined shape of the bezel has four sides, and wherein the series of light sources mounted on the circuit board form a shape with four sides and include four light sources on each of the four sides.

7. The portable tire inflator of claim 6, wherein each of the light sources in the series of light sources is a light emitting diode (LED).

8. The portable tire inflator of claim 7, wherein the first color emitted by each of the LEDs is blue.

9. The portable tire inflator of claim 7, wherein the second color emitted by each of the LEDs is white.

10. The portable tire inflator of claim 6, wherein the controller is configured to control a sequential first of the four light sources on each of the four sides together.

11. The portable tire inflator of claim 6, wherein the controller is configured to control a sequential second of the four light sources on each of the four sides together.

12. The portable tire inflator of claim 6, wherein the controller is configured to control a sequential third of the four light sources on each of the four sides together.

13. The portable tire inflator of claim 6, wherein the controller is configured to control a sequential fourth of the four light sources on each of the four sides together.

* * * * *